United States Patent
Fustinoni

(10) Patent No.: US 7,851,726 B2
(45) Date of Patent: Dec. 14, 2010

(54) APPARATUS FOR LASER CUTTING AND/OR MARKING

(75) Inventor: Ettore Fustinoni, Bergamo (IT)

(73) Assignee: SEI S.p.A., Curno (BG) (IT)

( * ) Notice: Subject to any disclaimer, the term of this patent is extended or adjusted under 35 U.S.C. 154(b) by 595 days.

(21) Appl. No.: 11/727,240

(22) Filed: Mar. 26, 2007

(65) Prior Publication Data

US 2007/0221621 A1 Sep. 27, 2007

(30) Foreign Application Priority Data

Mar. 27, 2006 (EP) .................................. 06425205

(51) Int. Cl.
*B23K 26/08* (2006.01)
(52) U.S. Cl. ............ 219/121.78; 74/89.22; 219/121.67; 219/121.8
(58) Field of Classification Search ............ 219/121.67, 219/121.68, 121.78, 121.79, 121.8, 121.72, 219/121.69; 33/1 M; 74/89.22; 700/166
See application file for complete search history.

(56) References Cited

U.S. PATENT DOCUMENTS

| 2,785,941 | A | | 3/1957 | Macklem et al. |
| 4,124,965 | A | * | 11/1978 | Stahl .......................... 53/412 |
| 5,051,558 | A | * | 9/1991 | Sukhman ............... 219/121.78 |
| 5,250,785 | A | * | 10/1993 | Blommel et al. ....... 219/121.67 |
| 6,070,480 | A | | 6/2000 | Kerschner |
| 2002/0091441 | A1 | * | 7/2002 | Guzik ........................ 700/166 |

FOREIGN PATENT DOCUMENTS

| DE | 44 44 523 | 6/1996 |
| FR | 2 564 356 | 11/1985 |
| GB | 2 391 535 | 2/2004 |
| WO | 96/37346 | 11/1996 |
| WO | 99/14011 | 3/1999 |

OTHER PUBLICATIONS

European Search Report for EP 06 42 5205, date search completed: Sep. 4, 2006.

* cited by examiner

*Primary Examiner*—Geoffrey S Evans
(74) *Attorney, Agent, or Firm*—Nixon & Vanderhye, PC

(57) ABSTRACT

An apparatus for cutting and/or marking products using laser beams includes at least one laser light emitter moveable in a first direction along a cross-bar, the cross-bar being in turn moveable above a working plane in a second direction transversal to the first direction, and at least two motors for moving the laser light emitter and the cross-bar. The laser light source is positioned to direct a laser light beam onto said working plane. Advantageously the two motors are positioned fixed and are coupled together and both to the laser light source, and to the cross-bar, by a transmission belt.

7 Claims, 2 Drawing Sheets

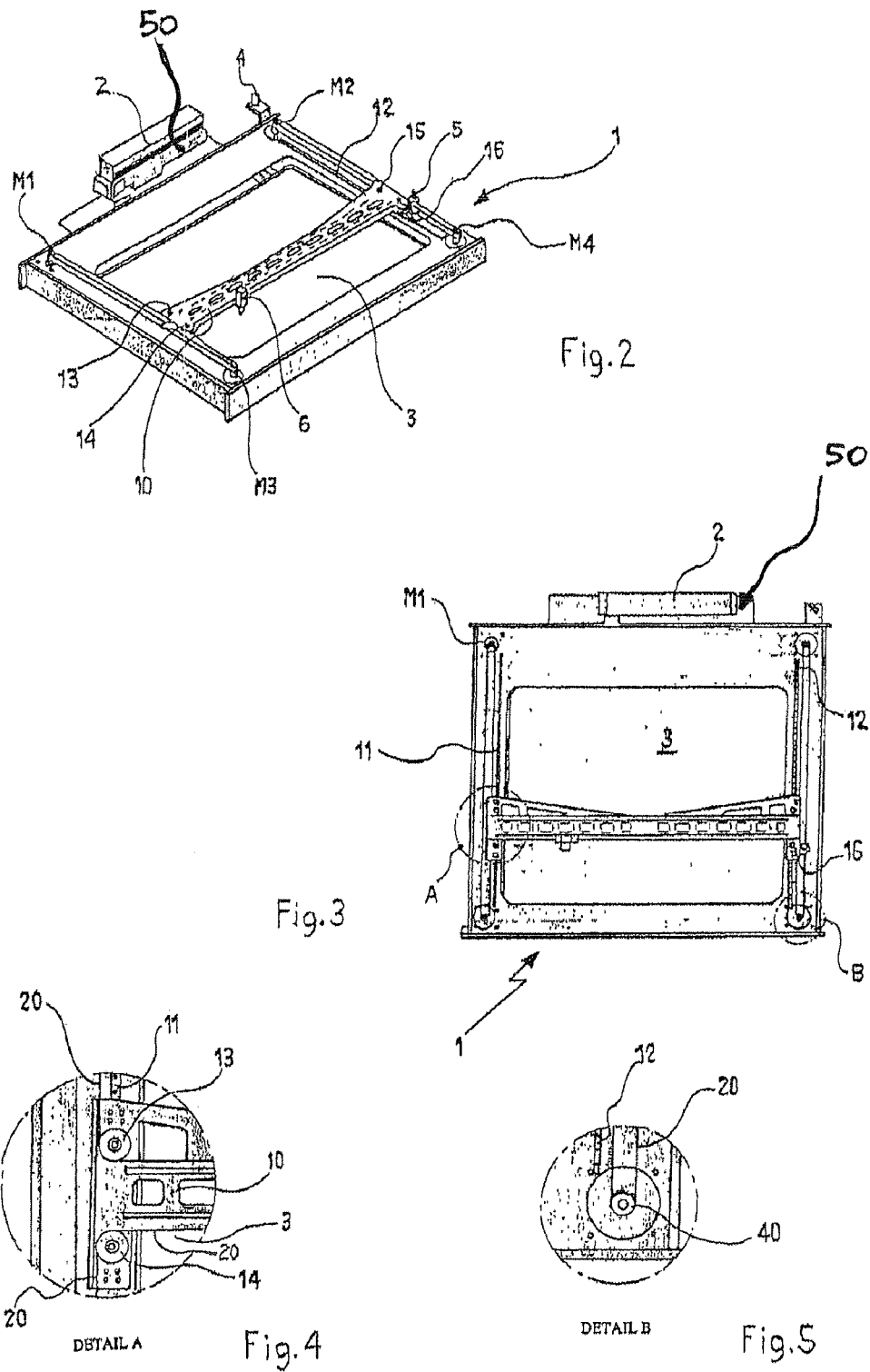

APPARATUS FOR LASER CUTTING AND/OR MARKING

Figure 1:
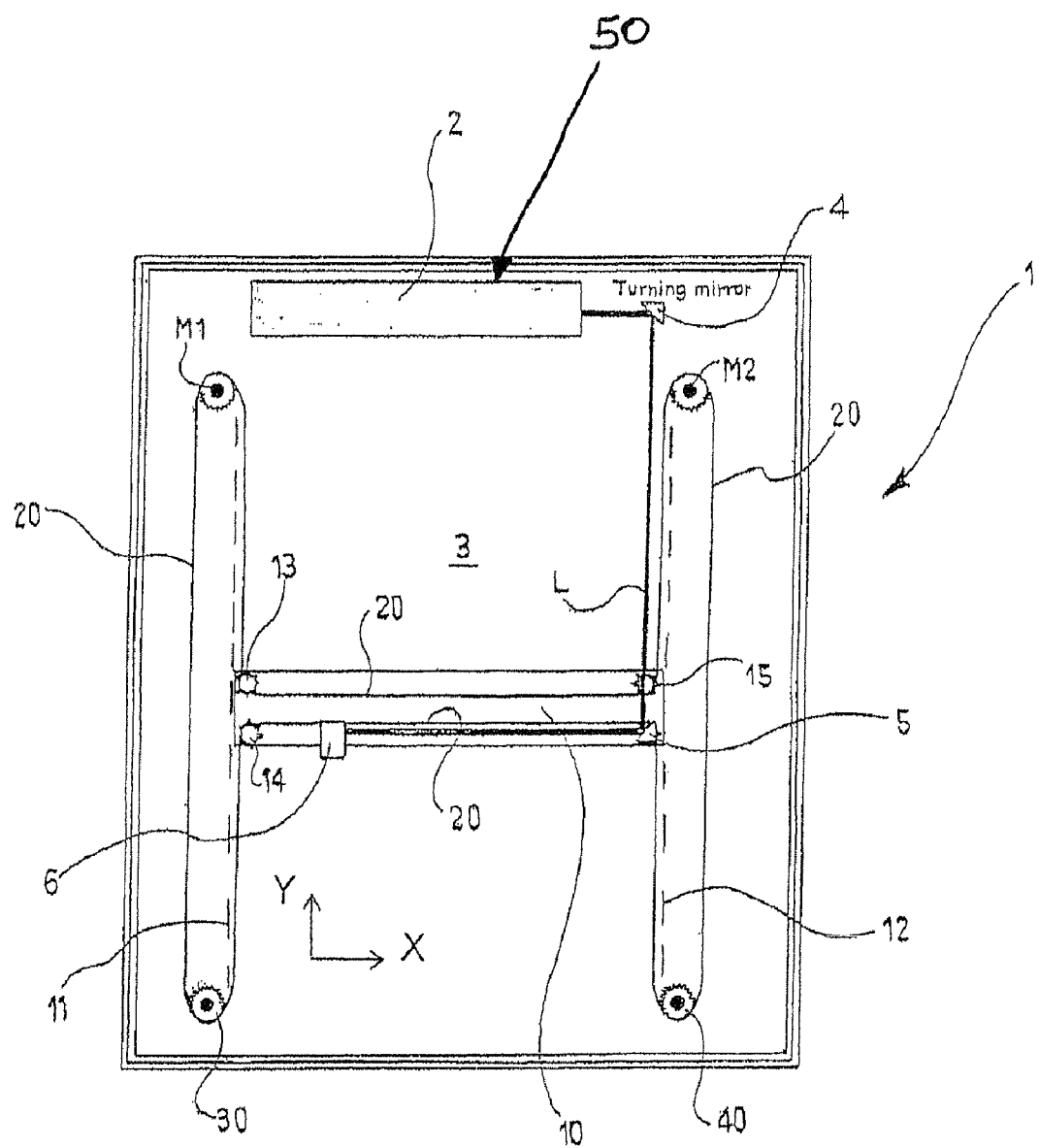

This application is a new utility application claiming priority to EP 06425205.9 filed 27 Mar. 2006, the entire contents of which are hereby incorporated by reference.

The present invention concerns an apparatus for laser cutting and/or marking, in particular an apparatus for cutting and/or marking sheet or foil products by means of laser light.

Apparatuses have been made available on the market since a long time which allow for cutting, or marking, different materials by means of laser light beams. For instance, the laser apparatuses are used for cutting or marking semi-finished products or finished products made in methacrylate, plastic, acetate, polyester, wood, paper, leather, metal o, still, organic or synthetic products.

The through-cutting is achieved by impinging the material with a high intensity laser beam which is able to pass through the whole thickness of the material. Marking and embossing (face-cutting) are achieved by impinging the material with a laser beam having lower intensity, in such a way to modify only the material surface, thereby defining a pattern, a drawing, a logo, writings, etc.

The laser apparatuses traditionally used for cutting and/or marking belong to logical groups, depending upon the kind of the laser source which are provided with, upon how the laser light beam is guided and focalized, etc.

U.S. Pat. No. 6,772,661, in the name of Mikkelsen et al., relates to a "two axes" apparatus for cutting sheet/foil products by means of a laser beam. The laser beam source is mounted on a laser head (laser mounting head) which can be translated in a first direction y, along a cross-bar. In turn, the cross-bar is translable on a working plane along a second direction x, which is orthogonal to the first direction y. The directions x and y are the "two Cartesian axes" of the apparatus. In other words, in the two-axes apparatuses the laser source is moveable on a plane over the working plane. The product to be processed is positioned on the working plane so as to be hit by the laser beam. Another "two-axes" apparatus is disclosed in U.S. Pat. No. 6,192,777 in the name of Williams et al.

Alternatively, other commercialized apparatuses provide moving the laser source mounting head along three axes. Besides the movements along the axes x, y, the laser source is translable orthogonally to the working plane in the direction z. For instance the international patent application WO 2005/113183, in the name of Yamaguchi et al., discloses a "three-axes" apparatus for cutting by means of a laser.

Solutions have been made available from long time which provide a laser source arranged in a fixed position. A laser beam focalizing head is provided on the movable cross-bar which has the duty of focalizing the beam onto the product under processing. The laser beam is directed onto the focalizing head by means of lenses and/or prisms. The focalizing head is provided with lenses having different focal length, in such a way to precisely adjust the laser beam focus.

Often the term "plotter" is used to identify the positioning system of the laser mounting head, or the focalizing head, comprising the cross-bar and the side posts, despite if it is a Cartesian two-axes or three-axes type.

Generally, known apparatuses are provided with electric motors having the function of moving the cross-bar and the head carrying the laser source, or moving the cross-bar and the focalizing head. For instance, in the apparatus according to U.S. Pat. No. 6,192,777 the moveable cross-bar is provided with an endless screw operated by a first electric motor. The laser mounting head engages the endless screw and two guides of the cross-bar. The rotation of the screw causes the translatory motion of the laser mounting head along the cross-bar. The cross-bar ends engage two toothed guides arranged laterally to the working plane, orthogonally to the cross-bar. A second electric motor, lodged on the cross-bar, is provided with means for matching the teeth of the guides to allow for the movement of the cross-bar above the working plane.

The electric motors generally have not a negligible mass. For this reason the presence of an electric motor on a moveable member, such as for example the cross-bar or the laser mounting head, highly increases inertia, with evident negative effects on the performances of the apparatus and the accuracy of the processes carried out.

In other words, in the known apparatuses a restriction to the need of minimizing inertia of the moving mechanical parts is given by the fact that at least one motor is supported and carried by the moveable cross-bar. An increasing in the apparatus performances generally requires an increasing in its power and torque and, thus, a corresponding increase of its mass (or size). The excessive increase in the size of the motors, moved together with other moveable parts, has a negative effect on the dynamic performance of the apparatus, because inertias increase correspondingly.

Accuracy in the positioning of the laser mounting head, or the focalizing head, is negatively affected by the increasing of inertia of the moveable parts. In fact acceleration and deceleration of the moveable cross-bar supporting a big size electric motor are more difficult to manage and set with respect to the case when a smaller size motor is used. Higher inertias also lead to mechanical disadvantages (deflections, torsions, vibrations, etc.) which are difficult to control and limit so as to achieve the proper positioning accuracy and avoid excessive increasing in the apparatus costs.

Some apparatuses are provided with linear motors, which permit to achieve high performances with lower inertia than traditional electric motors. Nevertheless the cost of this type of motors is high.

Instead, the need is felt from a long time for apparatuses for laser cutting which are at the same time economical, precise, reliable, and which provide minimum inertia of the moveable parts.

It is an object of the present invention to provide an apparatus for cutting and/or marking products by means of laser beams which overcomes the advantages of prior art apparatuses, being at the same time simple to assemble and economical.

It is also an object of the present invention to provide an apparatus for cutting and/or marking products by means of laser beams, which allows for optimizing the dynamics of the moving components, at the same time maximizing the accuracy of the positioning of the laser mounting head or the focalizing head.

It is another object of the present invention to provide an apparatus for cutting and/or marking products by means of laser beams which, compared to known apparatuses of the same type, allows for better performances and higher accuracy for what concerns the executed processes.

These and other objects are achieved by the present invention which concerns an apparatus for cutting and/or marking products by means of laser light beams, comprising at least one laser light emitter moveable in a first direction X along a cross-bar, said cross-bar being in turn moveable above a working plane in a second direction Y transversal to said first direction X, said emitter being positioned to direct a laser light beam towards said working plane, and at least two motors for moving said emitter and said cross-bar, characterized in that said at least two motors are positioned fixed and operate a single transmission belt being engaged to said emitter and to said cross-bar.

The emitter may be a laser light source or a focalizing head to focalize onto the product a laser light beam generated by an external source.

In the laser apparatus for cutting and/or marking according to the present invention, the electric motors are fixed with respect to the laser emitter, that is the motors are coupled to static elements such as, for instance, a frame. Preferably the frame is made from a single block in aluminum alloy, specifically designed to have high rigidity characteristics. The elements to be moved along the axes x, y are coupled to respective electric motors by means of a transmission belt. The belt is at least partially wounded about pulleys operated by the motors, and transmits the movement to moveable elements, which are guided properly.

Coupling of the transmission belt with the cross-bar is achieved by wounding the belt, at least partially, about idler wheels rotatably engaged to the same cross-bar.

In general, belts have less inertia than electric motors and provide for maximizing the travelling speed of the cross-bar and the laser mounting head, and for optimizing the respective accelerations, etc. In other words, the motion is transmitted to the moveable elements by means of a transmission belt coupled to fixed electric motors and operated by the same. The apparatus permits to achieve better dynamic performances than apparatuses provided with electric motors lodged on moving parts.

Thanks to the motors being arranged fixed, it is possible to set large size motors without negatively affecting the dynamic behaviour of the apparatus moveable members, this improving the speed and the accuracy of the laser light emitter positioning, which can be a laser source or a laser beam focalizing-head generated by an external source and diverted by means of mirrors or lenses.

In particular, the apparatus is provided with at least one belt arranged according to an H configuration, the same configuration of the cross-bar together with the respective lateral guides. The belt develops along a closed path, like an H, following the perimeter of the moveable cross-bar (horizontal part of the H path) and the respective guides at the sides of the working plane (vertical part of the H path). The path of the belt closes at the laser emitter, to which the ends of the belt are fixed. For example, if the working plane has an area of 1 m2, the length of the belt can be included in the range 5-6 m.

A plurality of idler wheels is arranged at the perimeter of the path and on the moveable cross-bar to direct the belt toward two electric motors engaged to a frame and positioned at the ends of the two vertical part of the H path. In particular, the cross-bar is provided with four idler wheels, two at each end of the same cross-bar, lined up along the direction Y.

The cross-bar, which undergoes high accelerations, is made to have high rigidity and at the same time low inertia. It can be designed having a "sandwich" structure, made of aluminum plates separated by an element having a honeycomb cellular structure. The aluminum plates and the element having a honeycomb cellular structure are stick together with adhesive substances having high rigidity. The geometric shape of the cross-bar is such that it minimizes flexion and torsion.

Operation of the apparatus is based upon controlling of the direction of rotation of the two electric motors. For instance, when the two electric motors rotate at the same speed and in opposite direction, the movable cross-bar is translated by the belt in the direction x upon the working plane. When the two motors rotate at the same speed and in the same direction, the emitter is translated by the belt in the direction y along the cross-bar.

Preferably the apparatus is provided with four (4) electric motors, each being arranged at an end of a vertical part of the belt H path, in such a way to minimize the length of the belt portions which extend between two consecutive motors along its path.

Controlling of the movement axes is operated by a control unit, for instance being provided with a microprocessor designed for this duty. The control unit operates on the basis of algorithms to model the dynamic response of the apparatus, the trajectories and the (pre-computed) transients, in order to distribute the laser beam energy as much uniform as possible along the working path on the working plane.

Preferably the control unit provides for the actuation of the motors in such a way that the laser beam hits the product under processing with an energy almost constant along its path. In other words, the control unit is programmed to operate the electric motors in such a way that the laser beam impinging the product has the same energy at each point of the path.

The apparatus according to the present invention provides a plurality of advantages with respect to the traditional solutions.

By using a belt for the operative connection between the motors and the focalizing head, or in an equivalent way between the motors and a laser source mounted on the cross-bar, the same motors can be positioned fixed, i.e. separated by the moving members of the apparatus. Moving the laser mounting-head is simply achieved by changing the direction of rotation of the motors. The performances, in terms of the moving speed of the emitter (or the laser mounting head) and in terms of the accuracy of its positioning are better than the performances which can be achieved with known apparatuses of the same type, with evident advantages for what concerns the productivity of the related processing.

The maintenance of the apparatus according to the present invention is simple. If needed, the belt can be replaced easily. Preferably the belt is made of a flexible material, for instance rubber. In this way it is possible to minimize the noise generated by relative rolling between the motor pulleys and the same belt.

Preferably, the belt is of the toothed V-type and is reinforced with internal steel strand. Alternatively the belt can have a different structure, being sufficient that the same has minimum extensibility when loaded, maximum flexibility and reliability.

The laser source can have high optical power, up to 500 W. In the preferred embodiment of the present invention the laser source is coupled to optics for low absorption reflection and transmission. The laser beam exiting the laser source is registered on the focalizing head by means of suitable optical assembly, in such a way to maintain an almost constant diameter, and is focalized by the same head on the product to be processed by means of a focalization lens.

The focalizing head is preferably made of an aluminum alloy having a low thermal coefficient of expansion, and provides for arranging focalization lenses having focal length included in the range 1.0-5.0 inches.

The focalizing head is preferably pneumatic sealed to resist pressure up to 10 bars and to allow for operations supported by gas (nitrogen, helium, etc.) or compressed air.

The lenses and the optics provided for directing and focalizing the laser beam generated by the related source have a high reflectivity dielectric coating.

The high dynamic performances of the apparatus allow for properly exploiting the full power which the laser source can provide, while securing productivity comparable to that typical of more complex and expensive apparatuses.

The apparatus according to the present invention can be manufactured at minimum costs, since the belt, the pulleys and the eventual idler wheels are elements available on the market at low cost.

Further aspects of the present invention will be more evident from the following illustrative non-limiting description, with reference to the annexed schematic drawings, wherein:

the FIG. 1 is a simplified scheme of an apparatus according to the present invention;

the FIG. 2 is a perspective view of an apparatus according to the present invention;

the FIG. 3 is a top view of the apparatus shown in FIG. 2;

the FIG. 4 is a detail of the apparatus shown in FIG. 2;

the FIG. 5 is a detail of the apparatus shown in FIG. 2.

The FIG. 1 is a scheme of an apparatus 1 according to the present invention. The apparatus comprises a laser light source 2, arranged in a fixed position, which generates a laser light beam L suitable for cutting, marking the product to be processed. For instance, the laser source can have a power of about 500 W. The laser light beam L, generated by the source 2, is diverted toward the working plane 3 by means of a series of focalizing and reflection optics 4, 5, 6, such as prisms, lenses, mirrors, focalizing heads, etc.

The product, having a substantially planar configuration, is positioned on the working plane 3 to be cut or marked by the laser light beam L. In the shown embodiment the working plane 3 has dimensions 1000×700 mm2, but in general its dimensions can be different, for example 300×300 mm2 or 1000×1000 mm2 and larger.

The focalizing head 6 receives the light laser beam L diverted by the mirrors 4 and 5 and focalizes it on the product positioned on the working plane 3. In this respect the focalizing head 6 can be defined as a laser light "emitter".

The emitter 6 is movable along the direction X on a cross-bar 10, which in turn is moveable along the direction Y on the working plane 3. In other words the apparatus 1 is of the type providing Cartesian axes X, Y.

In the embodiment shown in the figures the emitter 6 has a weight of about 300 g. The emitter 6 can be moveable in the direction Z (not shown), i.e. orthogonally to the working plane 3. This can be achieved by mounting the emitter on a suitable motorized support and providing proper optical assemblies 4 and 5.

The cross-bar 10 is raised over the working plane 3, so as to move above the product to be processed. The cross-bar 10 is made of a light material, to minimize the inertia of its movements, and rigid, to maximize the accuracy of the positioning of the emitter 6 with respect to the working plane 3. Preferably the cross bar is made of a composite material, for instance carbon fibre or carbon and Kevlar fibres, etc., or in aluminum, having a cell structure. In the embodiment shown, the cross bar 10 is of aluminum, having a cell structure, having a weight less than 3 (three) Kg.

The cross-bar 10 is guided in its movements along the direction Y by two lateral guides 11, 12 provided in the working plane 3, along the direction Y. The cross-bar 10 and the lateral guides 11 and 12 are positioned according to an H configuration. By moving the cross-bar 10 in the direction Y, and the emitter 6 in the direction X within suitable guides of the cross-bar 10, the laser beam L can be directed toward any point of the working plane 3.

In the traditional apparatuses the emitter 6 (the focalizing head) is operated by an electric motor positioned on the cross-bar 10, with evident disadvantages for what concerns the performances, which are negatively affected by the inertia, not inconsiderable, of the motor.

With reference to the FIGS. 1-3, the apparatus 1 is provided with at least two electric motors M1, M2, preferably of the brushless type, provided with high resolution encoders. The motors M1 and M2 drive a single transmission belt 20 engaged to the movable cross-bar 10 and the emitter 6.

The motors M1 and M2 are arranged fixed, for instance being engaged to the frame of the apparatus 1 or the working plan 3, in correspondence of the ends of the guides 11 and 12, as shown in the FIGS. 1-3. In the embodiment shown in the figures the motors M1 and M2 are arranged with vertical axis of rotation, that is orthogonally to the working plan 3, and drive a transmission belt 20, which operatively engages the cross-bar 10 (the respective idler wheels) and is coupled to the emitter 6. Preferably the transmission belt wounds about the motor shaft of each motor M1 and M2, or about pulleys driven by the shaft of the same motors.

The transmission belt 20 can be made with different materials and is substantially inextensible. For example, the transmission belt 20 can be made of rubber, and can be provided with an internal skeleton of metallic wires. In the shown embodiment, the transmission belt 20 has a length included in the range 5-6 m.

The belt 20 extends along an H path, following the configuration of the cross-bar 10 and the lateral guides 11 and 12. The belt 20 is guided on its path, other than by the motors M1 and M2, by a plurality of idler wheels 13, 14, 15, 16, 30, 40 and closes itself on the emitter 6. In other words the belt 20 follows the perimeter of the cross-bar 10 and the lateral guides 11, 12 and the ends of the transmission belt 20 are fixed on the emitter 6 (the focalizing head), at opposite parts with respect to the same. The idler wheels 13-16 are rotatably engaged to the cross-bar 10, in correspondence of its corners. In the following, the path defined by the transmission belt 20 will be described. A first end of the transmission belt 20 is coupled to the emitter 6. The belt 20 extends toward idler wheel 14 of the cross-bar 10, by which it is diverted toward the idler wheel 30 positioned fixedly at the end of the lateral guide 11, opposite with respect to the motor M1. The belt 20 extends from the idler wheel 30 to the motor M1 and then to the idler wheel 13, the idler wheel 15, the motor M2, the idler wheel 40 (equivalent to the wheel 30), the idler wheel 16. The second end of the belt 20 is coupled to the emitter 6, opposite with respect to the first end. As it has been said, the path is closed and has an H configuration.

The FIG. 4 shows in detail the portion of the cross-bar 10 comprising the idler wheels 13 and 14. The FIG. 5 shows in detail a portion of the apparatus 1 comprising the idler wheel 40.

Operation of the apparatus 1 is simple. The laser light source 2 emits a laser beam L which is directed toward the emitter 6, independently from the position of the cross-bar 10 with respect to the same source 2. The optics 4 and 5 provide for directing the laser beam towards the emitter 6. The optic 4 is fixed, for instance is engaged to the frame of the apparatus 1 or to the working plane 3. The optic 5 is securely engaged to the cross-bar 10 and moves together with the same in the direction Y. The emitter 6 focalizes the maser beam onto the product positioned on the working plane 3, under the cross-bar 10. The characteristics of the laser beam are controlled by a proper unit, for instance a computer which compensates the laser beam power depending on the speed and the acceleration of the emitter 6.

The control unit operates the motors M1 and M2 independently, at least for what concerns their direction of rotation.

When the motors M1 and M2 rotate at the same speed and in the same direction, the emitter 6 moves along the cross-bar 10 in the direction X. With reference to the FIG. 1, when the motors M1 and M2 rotate clockwise, the emitter 6 moves toward the left, that is toward the idler wheel 14. When the motors M1 and M2 rotate at the same speed counter-clockwise, the emitter 6 moves toward the right, that is toward the idler wheel 16 and the optic 5.

When the motors M1 and M2 rotate at the same speed and in the opposite direction, the emitter 6 remains stationary with respect to the cross-bar 10 and the last moves in the direction Y on the working plane 3. With reference to the FIG. 1, when the motors M1 and M2 rotate respectively in the clockwise and counterclockwise direction, the cross-bar 10 moves toward the laser light source 2. When the motors M1 and M2 rotate at the same speed, respectively in the clockwise and counterclockwise direction, the cross-bar 10 moves toward the idler wheels 30 and 40.

It is evident that the control unit 50 can operate the motors M1 and M2 in such a way to move the emitter 6 on the working plane 3 according to the desired trajectories, simply by checking the direction of rotation of the motors M1 and M2.

The apparatus 1 allows for the achievement of better performances than the traditional two-axes or three-axes laser apparatuses. The motors M1 and M2 are positioned fixed and thus do not contribute to the inertia of the moving parts of the apparatus 1. The transmission belt 20 is made of light materials and permits transmission of the movement to the cross-bar 10 and the emitter 6 in a simple and accurate way, without the typical drawbacks of the traditional apparatuses provided with a motor mounted on the cross-bar.

Preferably the apparatus 1 is provided with four motors M1, M2, M3 e M4. As shown in FIG. 2, the motors M3 and M4 replace the idler wheels 30 and 40. The motor M1 and the motor M3 are the first couple of motors, while the motor M2 and the motor M4 are the second couple of motors. The operation of the apparatus 1 provided with four motors is equivalent to the aforesaid one. Controlling is operated on the direction of rotation of the two couples of motors.

When the two couples of motors M1-M3 and M2-M4 rotate at the same speed and in the same direction, the emitter 6 moves along the cross-bar 10 in the direction X.

When the two couples of motors M1-M3 and M2-M4 rotate at the same speed and in the opposite direction, the emitter 6 remains stationary with respect to the cross-bar 10 and this moves in the direction Y above the working plane 3.

The apparatus shown in the FIG. 2 allows for achieving accelerations of the focalizing head 6, or the emitter, up to 4 g while moving for a vector scan of the working plane 3, and over 8 g while moving for a raster scan of the working plane 3. The focalizing head 6 can move at a speed of about 4 m/s and the accuracy of its positioning (static and dynamic) with respect to a point of the working plane 3 is in the order of 0.1 mm.

The performances, in terms of speed of moving of the focalizing head or the emitter 6, and in terms of accuracy of its positioning, are higher than the performances which the traditional apparatuses of the same type can provide, with evident advantages for what concerns the productivity of the related working processes.

The invention claimed is:

1. An apparatus for cutting and/or marking products by light beams, comprising a laser light source located in a fixed position to generate a laser light beam, reflection and focalizing optics including at least one laser light focalizing head to divert and focalize said laser light beam towards a working plane onto said products; said focalizing head being movable in a first direction (X) along a cross-bar, said cross-bar being in turn moveable above the working plane in a second direction (Y) transversal to said first direction (X), wherein the cross-bar engages two parallel guides arranged laterally with respect to said working plane, a single common transmission belt extends along an H path defined by the cross-bar and said two guides and engages said focalizing head and said cross-bar, to control its movement in said direction (Y), and to control the focalizing head movement in said direction (X), and said single transmission belt is driven by four motors, each of the four motors being positioned in correspondence of an end of said parallel guides, said single transmission belt connecting said four motors and being guided by idler wheels of the cross-bar.

2. The apparatus according to claim 1, wherein said laser source has a power in the range of 10 watts to 500 watts.

3. The apparatus according to claim 1, further comprising a control unit to control said motors and said emitter.

4. A method for cutting and/or marking products positioned on a working plane by a laser beam, comprising the steps of providing a laser light focalizing head moveable above said working plane along two orthogonal directions, further comprising the step of moving said focalizing head using only a single transmission belt driven by four motors having fixed positions.

5. A method for cutting and/or marking products positioned on the working plane of the apparatus according to claim 4, further comprising the step of operating a first couple of motors at the same speed and in opposite direction with respect to a second couple of motors to translate the moveable cross-bar in said direction (Y) and the step of operating said first couple of motors at the same speed and in the same direction of the second couple of motors to translate said emitter along the moveable cross-bar in said direction (X).

6. The method according to claim 4, further comprising the further step of operating said motors to move said laser beam onto said product with an energy distribution being constant in time and in space.

7. A method for cutting and/or marking products by laser light beams, comprising:
  positioning a laser light source in a fixed position to generate a laser light beam;
  providing reflection and focalizing optics including at least one laser light focalizing head to divert and focalize said laser light beam towards a working plane onto said products;
  configuring said focalizing head to be movable in a first direction (X) along a cross-bar, said cross-bar being in turn moveable above the working plane in a second direction (Y) transversal to said first direction (X);
  engaging two parallel guides arranged laterally with respect to said working plane with the cross-bar;
  providing a single transmission belt to extend along an H path defined by the cross-bar and said two guides to engage said focalizing head and said cross-bar, to control its movement in said direction (Y), and to control the focalizing head movement in said direction (X); and
  driving said single transmission belt by four motors, each of the four motors being positioned in correspondence of an end of said lateral guides, said single transmission belt connecting said four motors and being guided by idler wheels of the cross-bar.

* * * * *